United States Patent [19]

Chang

[11] Patent Number: 5,140,080

[45] Date of Patent: Aug. 18, 1992

[54] PROCESS FOR CONVERTING POLYKETONES TO POLY(KETO-ESTERS)

[75] Inventor: Biau-Hung Chang, West Chester, Ohio

[73] Assignee: Quantum Chemical Corporation, New York, N.Y.

[21] Appl. No.: 774,028

[22] Filed: Oct. 10, 1991

[51] Int. Cl.$^5$ ............................................. C08F 283/00
[52] U.S. Cl. ...................................... 525/539; 525/471
[58] Field of Search ................................. 525/471, 539

[56] References Cited

U.S. PATENT DOCUMENTS

| | | | |
|---|---|---|---|
| 2,495,292 | 9/1944 | Scott | 525/471 |
| 4,929,711 | 5/1990 | Chang et al. | 528/220 |
| 4,957,997 | 9/1990 | Chang et al. | 528/220 |
| 4,987,171 | 1/1991 | Bragel | 525/471 |

*Primary Examiner*—John C. Bleutge
*Assistant Examiner*—Frederick Krass
*Attorney, Agent, or Firm*—Kenneth D. Tremain; Gerald A. Baracka

[57] ABSTRACT

A process for converting polyketones to polyesters is provided. The process involves reacting a polyketone, such as an ethylene-carbon monoxide copolymer or terpolymer with aqueous hydrogen peroxide in an inert liquid medium at a temperature from −20° C. to 150° C. in the presence of a Lewis acid and a $C_{1-4}$ aliphatic monocarboxylic acid to convert a portion of the carbonyl functionality to oxycarbonyl groups.

17 Claims, No Drawings

PROCESS FOR CONVERTING POLYKETONES TO POLY(KETO-ESTERS)

FIELD OF THE INVENTION

The present invention relates to a process for converting polyketones to poly(keto-esters). More particularly, the invention involves a process whereby a portion of the carbonyl functionality in the polymer chain of a polyketone, such as an olefin-carbon monoxide copolymer, is oxidatively converted to oxycarbonyl functionality using hydrogen peroxide.

BACKGROUND OF THE INVENTION

Polyketones, i.e., polymers having carbonyl groups incorporated in the polymer chain, are known and are most commonly produced by polymerizing carbon monoxide with one or more $\alpha$-olefins. Polyketones of this type derived from ethylene and carbon monoxide are disclosed by Brubaker in U.S. Pat. No. 2,495,286. Numerous other liquid and gas phase procedures utilizing Ziegler and radical catalysts have been described in the prior art for polymerizing carbon monoxide with ethylene and other olefinically unsaturated monomers. A general review of the properties, preparations, reactions and uses of olefin-carbon monoxide copolymers can be found in the *Encyclopedia of Polymer Science and Technology*, Vol. 9, p. 397–402, John Wiley & Sons, Inc. (1968).

Various procedures are known for the chemical modification of polyketones. U. S. Pat. No. 2,457,271 discloses a method for modifying monoolefin-carbon monoxide copolymers to increase the degree of unsaturation by heating the copolymer in a solution of an organic solvent with a minor amount of an alkali metal hydroxide. The copolymer is reacted until the oxygen content is decreased by at least 5% or the iodine number increased to at least 25. Modification of polyketones (monoolefin-carbon monoxide copolymers) by reaction with hydrazine hydrate and related nitrogen-containing compounds is described in U.S. Pat. No. 2,457,279. A process for reacting polyketones with hydrogen cyanide to prepare polycyanohydrin resins is disclosed in U.S. Pat. No. 2,495,284.

U.S. Pat. No. 2,495,292 discloses the catalytic hydrogenation of monoolefin-carbon monoxide polymers in the presence of a nickel catalyst to reduce the carbonyl groups to secondary alcohol groups and obtain high molecular weight polyhydric alcohols. U. S. Pat. No. 2,846,406 relates to a process for reacting monoolefin-carbon monoxide copolymers with formaldehyde and specific ammonium or amine salts to produce polyamines of relatively high molecular weight. Another process for modifying monoolefin-carbon monoxide copolymers by reaction with hydrazoic acid in the presence of an acid catalyst is disclosed in U.S. Pat. No. 3,068,201.

Processes for producing thermoplastic polymers from polyketones are also disclosed in U.S. Pat. Nos. 3,979,373 and 3,979,374. The products of U.S. Pat. No. 3,979,373 are polymeric furan derivatives obtained by reacting an equimolar alternate copolymer of ethylene and carbon monoxide with a strong acid, e.g. sulfuric, phosphoric, p-toluene sulfonic, etc., at 40°–200° C. The polymeric pyrrollic polymers of U.S. Pat. No. 3,979,374 are obtained by reacting an equimolar alternate copolymer of ethylene and carbon monoxide with a primary monoamine in the presence of strong acid and a solvent at a temperature from 40°–100° C.

U.S. Pat. Nos. 4,616,072 and 4,687,805 disclose halogenating ethylene-carbon monoxide copolymers by contacting said copolymers in a liquid medium and in the presence of an anionic halogenation catalyst selected from Lewis acids and Lewis bases.

Oxidation and chain cleavage of ethylene-carbon monoxide copolymers to produce mixtures of $\alpha,\omega$-dicarboxylic acids ranging from succinic acid through dodecanedioic acid and possibly higher and their corresponding esters is disclosed in U.S. Pat. No. 2,436,269. The oxidation is typically accomplished utilizing nitric acid and a vanadium oxidation catalyst, e.g., vanadium pentoxide or ammonium vanadate. Other oxidizing agents which are disclosed include the higher oxides of nitrogen, chromic acid, permanganates, molecular oxygen or air, or mixtures thereof.

A process for converting polyketones to polyesters by oxidizing ethylene-carbon monoxide copolymers in a liquid medium using organic peroxyacid oxidizing agents is disclosed in U.S. Pat. No. 4,929,711. Substantially all or only a portion of the carbonyl functionality can be oxidized by the process. In U.S. Pat. No. 4,957,997 it is disclosed to oxidize polyketones containing pendant functionality groups, such as ethylene-vinyl acetate-carbon monoxide terpolymers, using organic peroxyacids to convert substantially all or only a portion of the carbonyl functionality to oxycarbonyl groups. European Patent Application No. 89202833.3, published Jun. 13, 1991, as Publication No. 0372602, also discloses that derivatives of polyketones can be obtained using the Baeyer-Villiger reaction. Aromatic peroxyacids are suggested as the oxidizing agent for this reaction with an acid catalyst.

While peroxyacids are effective oxidizing agents for polyketones, they are expensive and in some cases are dangerous to handle. It would be highly advantageous if a process were available whereby carbonyl groups incorporated in a polymer chain, such as with polyketones obtained by the polymerization of olefins and carbon monoxide, could be oxidized to ester groups utilizing hydrogen peroxide as the oxidizing agent. It would be even more advantageous if this could be accomplished without significant cleavage of the polymer chain, i.e., without substantially altering the molecular weight and molecular weight distribution of the polymer. Substituting hydrogen peroxide for the organic peroxyacids in the above-described processes of U.S. Pat. Nos. 4,929,711 and 4,957,997 has not, however, proved to be effective for converting carbonyl groups to oxycarbonyl moieties. The use of Lewis acids, e.g., $BF_3$, with hydrogen peroxide, a widely used reagent combination for the Baeyer-Villiger oxidation of numerous keto compounds provides unacceptably low conversions with polyketones.

It would be highly advantageous if a process which utilized hydrogen peroxide as the oxidizing agent were available to convert carbonyl functionality present in the polymer chain of polyketones to oxycarbonyl groups. It would be even more desirable if the process could achieve conversions of 40 percent or greater with minimal production of undesirable by-products. These and other advantages are realized by the process of the present invention and will be described in more detail to follow.

SUMMARY OF THE INVENTION

The present invention relates to a process for converting a polyketone to a poly(keto-ester) by oxidizing a portion of the carbonyl groups present in the polymer chain to oxycarbonyl groups. The reaction involves contacting a polyketone of greater than 1,000 molecular weight and 0.01 to 50 weight percent carbonyl group with hydrogen peroxide in an inert liquid medium at a temperature from 20° C. to 200° C. in the presence of a Lewis acid and a $C_{1-4}$ aliphatic monocarboxylic acid. The molar ratio of hydrogen peroxide to carbonyl group ranges from 0.1:1 to 150:1 and the weight ratio of polyketone to inert liquid medium ranges from 1:5 to 1:200. The weight ratio of the Lewis acid to the liquid medium ranges from 0.00001:1 to 0.5:1 and the weight ratio of aliphatic carboxylic acid to liquid medium ranges from 0.001:1 to 10:1.

In a particularly useful embodiment of the invention, polyketones having molecular weights from about 10,000 to 1,000,000 and carbonyl contents from 0.5 to 20 weight percent are converted to poly(keto-esters). The process is especially useful for the conversion of polymers of ethylene and carbon monoxide such as ethylene-carbon monoxide copolymers and terpolymers of ethylene, carbon monoxide and a vinyl or vinylidene monomer, such as $C_{3-8}$ α-olefins or vinyl acetate, to the corresponding poly(keto-esters).

DETAILED DESCRIPTION OF THE INVENTION

The present invention broadly relates to a process for converting polyketones to poly(keto-esters) utilizing hydrogen peroxide as the oxidizing agent. As employed herein the term polyketone generally refers to polymers having a plurality of carbonyl

groups in the polymer chain. The carbonyl groups, sometimes also referred to herein as ketone or keto groups, may be randomly or uniformly distributed throughout the polymer chain.

The term poly(keto-ester) is used herein in a generic sense and encompasses any polymer having one or more carbonyl and oxycarbonyl

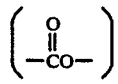

groups incorporated in the polymer chain. The oxycarbonyl groups are also referred to herein as ester groups. A broad array of useful poly(keto-ester) products can be produced by the present process depending on the polyketone employed and the extent of carbonyl conversion. By judicious selection of the process conditions, it is possible to vary the composition of the resulting poly(keto-esters) with respect to the amount of carbonyl and oxycarbonyl groups present therein, thus making it possible to "tailor" products to meet predetermined specifications.

Considering the reaction of only a single carbonyl group within a polyketone molecule derived from the copolymerization of ethylene and carbon monoxide, the process can be represented as follows:

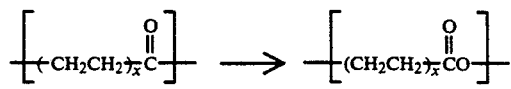

or

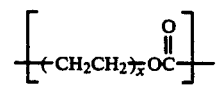

where x is an integer representing the number of adjoining ethylene units at a particular CO site. As is evident from the above equation, insertion of the oxygen atom can occur on either side of the carbonyl.

While it is theoretically possible to obtain quantitative conversion of the carbonyl to oxycarbonyl groups, practically this is not possible so that substantial amounts of carbonyl functionality will remain and be present with the oxycarbonyl groups in the resulting poly(keto-ester) product. The reaction showing one possible molecular configuration which could result when only one of two adjacent carbonyl groups is oxidized can be represented as follows:

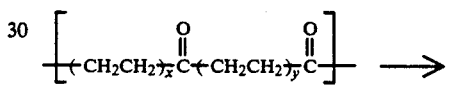

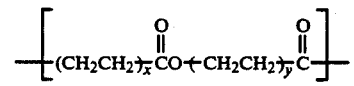

where x and y are integers which can be the same or different and represent the number of ethylene units.

Polyketone polymers utilized for the preparation of the poly(keto-esters) in accordance with the process of the present invention comprise a hydrocarbon polymer chain having a plurality of carbonyl groups distributed throughout with the carbon atom of the carbonyl being part of the polymer chain. The polymer chain is comprised substantially entirely of carbon atoms. The carbonyl groups may be either randomly or uniformly distributed within the polymer molecule, i.e. along the polymer backbone. The polyketones can structurally be represented as being comprised of repeating units of the structural formula

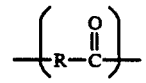

where R represents a bivalent hydrocarbon moiety.

The molecular weight of the polyketones can range from about 1,000 up to several million or more. It is possible to react extremely high molecular weight polyketones (up to about 5 million), however, the polyketones will typically have molecular weights from 1,000 to 2,000,000. Most commonly, the molecular weight of the polyketones will range from about 10,000 up to about 1,000,000. The carbonyl content (% CO) of the polyketones can range from 0.01 weight percent up to about 50 weight percent. Most usually, carbonyl contents range from 0.5 weight percent up to about 20 weight percent.

Useful polyketones can be obtained by any of the known procedures described in the art. The method of preparation of the polyketone plays no role in the process of the invention so long as the polyketone is substantially free of impurities, such as catalyst residues or the like, which might interfere with the oxidation reaction. While the polyketones are most advantageously prepared by the copolymerization of carbon monoxide and α-olefins, other procedures can be utilized. These include, for example, copolymerization of ethylene with aliphatic aldehydes at high temperature and pressure; oxidation of polyvinylalcohol or polyethylene; cationic polymerization of ketene or diketene; radical ring-opening polymerization of unsaturated cyclic ethers or diketene; and radical ring-opening polymerization of 2,2-diphenyl-4-methylene-1,3-dioxolane.

Polyketones are most commonly produced by the copolymerization of carbon monoxide and α-olefins or mixtures of α-olefins and numerous procedures for the preparation of these polymers are known and described in the prior art. α-Olefins used typically have from 2 to 12 carbon atoms and include aliphatic α-olefins, such as ethylene, propylene, butene-1, isobutylene, hexene-1, octene-1, and α-olefins having aromatic substituents, such as styrene, p-methyl styrene, α-methyl styrene and the like. Other vinyl and vinylidene monomers may also be included in the copolymerization such as acrylonitrile; acrylamide; vinyl chloride; vinylidene chloride; vinyl acetate; methyl vinyl ketone; vinylpyridine; acrylic acid and esters thereof; methacrylic acid and esters thereof; and the like. Polyketones obtained by polymerizing carbon monoxide and ethylene or carbon monoxide, ethylene and vinyl acetate or a $C_{3-8}$ α-olefin are most advantageously utilized in the present process.

The physical characteristics of the resulting poly(keto-ester) are a function of the molecular weight and the molecular weight distribution of the polymer and the extent of conversion of carbonyl groups to oxycarbonyl groups. These in turn primarily depend on the composition of the polyketone, the reaction conditions, and the amount of hydrogen peroxide and catalytic agent(s) used The process of this invention is carried out in a medium which is a liquid at the reaction temperature employed and which does not react with either the polyketone or the poly(keto-ester) and which is not oxidized under the reaction conditions. Additionally, the liquid must be one which is either capable of dissolving or swelling the polymer. While the boiling point of the inert liquid medium is not critical, the boiling point should not be so high as to make removal of the solvent difficult. When liquids with boiling points lower than the reaction temperature are used for the process, the reaction can be run under reflux conditions or in a pressure vessel.

Useful mediums for the reaction include hydrocarbons, chlorinated hydrocarbons, nitro-substituted hydrocarbons and carboxylic acid esters. Hexane, heptane, octane, benzene, decalin, methylene chloride, chlorobenzene, dichlorobenzene, nitrobenzene and dimethylphthalate are illustrative of the compounds which can be used as the reaction medium for the process. $C_{5-10}$ aliphatic hydrocarbons, benzene, chlorinated $C_{1-3}$ aliphatic hydrocarbons, chlorobenzene and dichlorobenzene are particularly advantageous for the process.

The polyketone to liquid medium weight ratio can vary over broad limits from about 1:5 to about 1:200. The preferred weight ratio of polyketone to liquid ranges from 1:10 up to about 1:100.

Hydrogen peroxide is employed as the oxidizing agent for the process and is dispersed or dissolved in the inert liquid medium and contacted with the polyketone. The molar ratio of hydrogen peroxide to carbonyl functionality can range from about 0.1:1 to 150:1 depending on the desired conversion, but, most preferably, will range from about 1:1 to 100:1. This is the number of moles of hydrogen peroxide per mole of carbonyl group. The hydrogen peroxide is introduced as an aqueous solution which typically contains 30 percent to 95 percent $H_2O_2$.

The reaction can be carried out at temperatures from about 20° C. up to about 200° C., however, it is considered most advantageous to carry out the reaction at a temperature from about 20° C. to 100° C. While reaction times will vary, they will generally range from about 30 minutes up to about 24 hours where low reaction temperatures and/or concentrations of reactants are used. Reaction conditions and time of reaction are selected based on the degree of conversion of carbonyl to oxycarbonyl desired and to minimize undesirable chain scission reactions and by-product formation. The extent of oxidation, i.e., percent conversion of carbonyl to oxycarbonyl, can be varied within wide limits but, in general, it is difficult to achieve carbonyl conversions much above 60 percent. Most commonly the reaction is carried out so that 20 to 60 percent of the carbonyl functionality is oxidized to oxycarbonyl groups.

A Lewis acid and an aliphatic carboxylic acid are necessarily employed with the hydrogen peroxide for the process. Lewis acids which are useful include bromides, chlorides, fluorides, oxyfluorides and oxychlorides of boron, antimony, tantalum, titanium, tungsten, zinc and tin or hydrates, etherates or complexes thereof. The Lewis acid is present at a weight ratio from 0.00001:1 to 0.5:1, based on the liquid medium. More preferably, the weight ratio of Lewis acid to liquid medium ranges from 0.0001:1 to 0.05:1. Especially useful Lewis acids include the fluorides of boron, antimony and titanium or the hydrates, etherates or complexes thereof. Boron trifluoride, etherates of boron trifluoride and complexes of boron trifluoride with alcohols or carboxylic acids are particularly advantageous. Illustrative carboxylic or alcohol complexes of boron trifluoride include boron trifluoride-acetic acid complex, boron trifluoride-propionic acid complex, boron trifluoride-methanol complex and boron trifluoride-propanol complex.

Carboxylic acids employed to promote the oxidation are $C_{1-4}$ aliphatic monocarboxylic acids. Such acids include formic, acetic, propionic, butanoic acids and mixtures thereof. The carboxylic acid is present at a weight ratio from about 0.001:1 to 10:1, based on the liquid medium. More preferably, the weight ratio of aliphatic carboxylic acid to the liquid medium will range from 0.01:1 to 0.5:1.

The poly(keto-ester) products prepared in accordance with the invention are recovered utilizing conventional procedures known to the art. Generally, the reaction mixture is cooled to ambient conditions to precipitate the polymer which is then recovered by filtration. To facilitate this precipitation, precipitating diluents which are non-solvents for the poly(keto-ester), i.e. do not dissolve or swell the polymer, can be added.

Such precipitating diluents include, but are not limited to, methanol, ethanol, propanol, t-butanol, acetone and the like. Since excess hydrogen peroxide, Lewis acid and carboxylic acids may be precipitated with the poly(keto-ester), it may be advantageous to re-dissolve the polymer in a solvent, such as toluene or xylene, and re-precipitate by the addition of one or more of the aforementioned precipitating diluents. The recovered polymer is then dried and, if desired, additives incorporated therein.

It is known that the substrate polyketones, particularly ethylene-carbon monoxide copolymers, exhibit photodegradability due to absorption of radiation by the carbonyl chromophore (Comprehensive Polymer Science, Vol 6, p. 530, Pergamon Press); the poly(keto-ester) products obtained according to the present process which result from the partial conversion of carbonyl to oxycarbonyl moieties are both photodegradable and biodegradable. This is a particularly useful combination of properties. The degree of biodegradability increases with increasing percent conversion of main-chain carbonyl groups to oxycarbonyl moieties. The degradable poly(keto-esters) obtained in accordance with the present process are highly useful as plastics, waxes, adhesives and coatings.

The following examples illustrate the invention more fully; however, they are not intended as a limitation on the scope thereof. In the examples all parts, percentages and ratios are on a weight basis unless otherwise indicated.

EXAMPLE

One-half gram polyketone (an ethylene-carbon monoxide copolymer resin containing 1.6 mole percent CO; Mw 125,000; Mn 18,000) was charged to a flask containing 30 mls chlorobenzene and heated at 80°-90° C. until the polymer was dissolved. The weight ratio of polyketone to chlorobenzene was 1:66. Glacial acetic acid (5 mls), boron trifluoride etherate (0.07 gram) and 70% aqueous hydrogen peroxide (1 ml) were then charged to the reactor. The weight ratios of acetic acid to chlorobenzene and boron trifluoride etherate to chlorobenzene were 0.16:1 and 0.002:1, respectively. The reaction mixture was maintained with stirring for 3 hours at 90° C. After allowing the reaction mixture to cool to room temperature, methanol (100 mls) was added to precipitate the polymer. The polymer was recovered by filtration, washed with methanol and purified by redissolving in toluene followed by reprecipitation with methanol. The final poly(keto-ester) product was dried at room temperature under vacuum. Analysis of the resulting product by infrared spectroscopy showed a strong absorption at 1735 cm$^{-1}$ attributable to the presence of ester carbonyl. The infrared spectrum also showed a significant decrease in the ketone carbonyl absorption at 1710 cm$^{-1}$ compared to the starting polyketone. Based on the relative heights of the infrared absorption peaks, conversion of carbonyl to oxycarbonyl was calculated to be 40%. Ester formation was also confirmed by nuclear magnetic resonance spectroscopy.

COMPARATIVE EXAMPLE A

For this comparison, Example I was repeated except that the acetic acid was omitted. After 3 hours reaction at 90° C., conversion of carbonyl to oxycarbonyl was 20%—only half that obtained when acetic acid was included in the reaction. This comparison clearly demonstrates the improved results obtained when acetic acid is present with the hydrogen peroxide and the Lewis acid.

EXAMPLE II

Example I was repeated except that the reaction temperature was 80° C. After 3 hours reaction at 80° C., 45% conversion of carbonyl to oxycarbonyl was obtained.

EXAMPLE III

One-half gram of the polyketone of Example I was dissolved in 30 mls chlorobenzene at 90° C. followed by the addition of 5 mls glacial acetic acid, 0.007 gram boron trifluoride etherate and 2 mls 70% aqueous hydrogen peroxide. The reaction mixture was stirred for 3 hours at 90° C. and the poly(keto-ester) was recovered in the usual manner. Infrared analysis of the poly(keto-ester) showed the presence of a strong ester absorption at 1735 cm$^{-1}$. Comparison of the relative height of this peak to the carbonyl peak indicated 45% conversion of carbonyl to oxycarbonyl.

EXAMPLES IV-X

A series of experiments were carried out following the general procedure described in Example I. The amount and type of carboxylic acid were varied. The polyketone, liquid medium, hydrogen peroxide and Lewis acid used were the same as in Example I except as noted. For the purpose of comparison and to demonstrate the criticality of the $C_{1-4}$ aliphatic monocarboxylic acids for the process, three comparative examples (B-D) were also carried out. Details of each of the reactions and results obtained were as follows:.

|      | Carboxylic Acid/ mls           | Reaction Temp.(C.°) | Reaction Time (hrs) | Carbonyl Conversion (%) |
| ---- | ------------------------------ | ------------------- | ------------------- | ----------------------- |
| IV   | Propanoic acid/5               | 90                  | 3                   | 40                      |
| V    | Propanoic acid/10              | 80                  | 3                   | 50                      |
| VI*  | Propanoic acid/5               | 90                  | 3                   | 55                      |
| VII  | Formic acid/5                  | 80                  | 3                   | 50                      |
| VIII | Formic acid/2 Propanoic acid/3 | 80                  | 3                   | 60                      |
| IX   | Formic acid/2 Acetic acid/5    | 80                  | 3                   | 50                      |
| X    | Butanoic acid/5                | 80                  | 3                   | 30                      |
| B    | Hexanoic acid/5                | 80                  | 5                   | 5                       |
| C    | Octanoic acid/5                | 80                  | 5                   | 5                       |
| D    | Malonic acid/5 g.              | 90                  | 3                   | 5                       |

*2 mls 70% $H_2O_2$ were used in this reaction

It is apparent from the above data that significant conversion of carbonyl functionality is obtained using $C_{1-4}$ monocarboxylic acids whereas negligible carbonyl conversion is achieved when a dicarboxylic acid or higher monocarboxylic acids are employed.

EXAMPLE XI

To demonstrate the ability to utilize other Lewis acids for the reaction, one-half gram of the polyketone of Example I was dissolved in 30 mls chlorobenzene. To this solution were added 0.13 gram antimony tetrafluoride, 5 mls glacial acetic acid and 1 ml 70% aqueous hydrogen peroxide. The reaction mixture was heated at 80° C. and stirred for 3 hours. The resulting poly(keto-ester) product was recovered in the usual manner and analyzed by infrared spectroscopy. Forty percent carbonyl conversion was obtained. When the reaction was repeated under identical conditions without the acetic acid, the carbonyl conversion was reduced to 30%.

I claim:

1. A process for converting polyketones to poly(keto-esters) comprising:
   (1) dissolving or dispersing a polyketone of greater than 1000 molecular weight and containing 0.01 to 50 weight percent carbonyl functionality in an inert liquid medium, the weight ratio of said polyketone to said liquid medium ranging from 1:5 to 1:200;
   (2) contacting the polymer solution or dispersion formed in Step (1) with an amount of aqueous hydrogen peroxide sufficient to oxidize a portion of the carbonyl functionality to oxycarbonyl groups, said oxidation conducted at a temperature from 20° C. to 200° C. in the presence of a Lewis acid and an aliphatic monocarboxylic acid containing from 1 to 4 carbon atoms or a mixture of $C_{1-4}$ aliphatic monocarboxylic acids; and
   (3) recovering the poly(keto-ester).

2. The process of claim 1 wherein the polyketone is a copolymer of carbon monoxide and an α-olefin or mixture of α-olefins.

3. The process of claim 1 wherein the inert liquid medium is selected from the group consisting of hydrocarbons, chlorinated hydrocarbons, nitro-substituted hydrocarbons and carboxylic acid esters.

4. The process of claim 1 wherein the Lewis acid is selected from the group consisting of bromides, chlorides, fluorides, oxyfluorides and oxychlorides of boron, antimony, tantalum, titanium, tungsten, zinc and tin or hydrates, etherates or complexes thereof.

5. The process of claim 1 wherein the weight ratio of Lewis acid to liquid medium is from 0.00001:1 to 0.5:1 and the weight ratio of the aliphatic monocarboxylic acid to liquid medium is from 0.001:1 to 10:1.

6. The process of claim 1 wherein the polyketone is a copolymer of carbon monoxide and an α-olefin or mixture of α-olefins; the inert liquid medium is selected from the group consisting of hydrocarbons, chlorinated hydrocarbons, nitro-substituted hydrocarbons and carboxylic esters; the Lewis acid is selected from the group consisting of bromides, chlorides, fluorides, oxychlorides and oxyfluorides of boron, antimony, tantalum, titanium, tungsten, zinc and tin or hydrates, etherates or complexes thereof; the molar ratio of hydrogen peroxide to carbonyl functionality ranges from 0.1:1 to 150:1; the weight ratio of Lewis acid to liquid medium is from 0.00001:1 to 0.5:1; and the weight ratio of aliphatic monocarboxylic acid to liquid medium is from 0.001:1 to 10:1.

7. The process of claim 6 wherein the polyketone is an ethylene-carbon monoxide copolymer, an ethylene-carbon monoxide-$C_{3-8}$ α-olefin terpolymer, or an ethylene-carbon monoxide-vinyl acetate terpolymer.

8. The process of claim 7 wherein the Lewis acid is a fluoride of boron, antimony or titanium or a hydrate, etherate or complex thereof.

9. The process of claim 8 wherein the polyketone has a molecular weight from 1000 to 2,000,000 and contains from 0.5 to 20 weight percent carbonyl.

10. The process of claim 9 wherein the weight ratio of polyketone to liquid medium is from 1:10 to 1:100 and the liquid medium is selected from the group consisting of $C_{5-10}$ aliphatic hydrocarbons, benzene, chlorinated $C_{1-3}$ aliphatic hydrocarbons, chlorobenzene and dichlorobenzene.

11. The process of claim 10 wherein the weight ratio of Lewis acid to liquid medium ranges from 0.0001:1 to 0.05:1 and the weight ratio of aliphatic monocarboxylic acid to liquid medium ranges from 0.01:1 to 0.5:1.

12. The process of claim 11 wherein the Lewis acid is boron trifluoride, an etherate of boron trifluoride or complex of boron trifluoride with an alcohol or carboxylic acid.

13. The process of claim 12 wherein the reaction is carried out at a temperature from 20° C. to 100° C.

14. The process of claim 12 wherein the polyketone is an ethylene-carbon monoxide copolymer.

15. The process of claim 14 wherein the Lewis acid is boron trifluoride etherate and the liquid medium is chlorobenzene.

16. The process of claim 12 wherein from 20 to 60 percent of the carbonyl functionality of the polyketone is oxidized to oxycarbonyl.

17. The process of claim 12 wherein the aliphatic monocarboxylic acid is formic acid, acetic acid, propanoic acid or mixtures thereof.

* * * * *